United States Patent

Fujimoto

[11] Patent Number: 5,798,598
[45] Date of Patent: *Aug. 25, 1998

[54] VIBRATION DRIVEN DEVICE

[75] Inventor: Kosuke Fujimoto, Tokyo, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 749,624

[22] Filed: Nov. 18, 1996

Related U.S. Application Data

[63] Continuation of Ser. No. 321,565, Oct. 12, 1994, abandoned.

[30] Foreign Application Priority Data

Oct. 13, 1993 [JP] Japan ............ 5-255663

[51] Int. Cl.$^6$ ............ H01L 41/08
[52] U.S. Cl. ............ 310/323
[58] Field of Search ............ 310/323, 328, 310/366

[56] References Cited

U.S. PATENT DOCUMENTS

| | | |
|---|---|---|
| 4,779,019 | 10/1988 | Onishi et al. ............ 310/323 |
| 4,829,209 | 5/1989 | Kawasaki et al. ............ 310/323 |
| 5,025,186 | 6/1991 | Tsukada ............ 310/323 |
| 5,134,333 | 7/1992 | Atsuta ............ 310/323 |
| 5,406,160 | 4/1995 | Shirasaki ............ 310/323 |
| 5,416,374 | 5/1995 | Inoue et al. ............ 310/323 X |

FOREIGN PATENT DOCUMENTS

| | | |
|---|---|---|
| 0383309 | 8/1990 | European Pat. Off. . |
| 0536409 | 4/1993 | European Pat. Off. . |
| 62-193569 | 8/1987 | Japan . |

*Primary Examiner*—Mark O. Budd
*Attorney, Agent, or Firm*—Fitzpatrick, Cella, Harper & Scinto

[57] ABSTRACT

A vibration driven device includes a vibration member having a plurality of projective portions, and an electromechanical energy conversion element contacting the vibration member. The conversion element has a plurality of electrodes, and the vibration member is vibrated by applying a signal to the electrodes. Each end portion of the plurality of electrodes of the conversion element is located coincident with one of the plurality of projection portions of the vibration member.

16 Claims, 4 Drawing Sheets

VIBRATION DRIVEN DEVICE

This application is a continuation of application Ser. No. 08/321,565 filed Oct. 12, 1994, now abandoned.

BACKGROUND OF THE INVENTION

1. Field of the Invention

The present invention relates to a vibration driven device such as a vibration wave motor.

2. Related Background Art

A vibration wave motor, especially, a vibration wave motor having a vibration member comprising, e.g., a ring-shaped vibration member or the like has the following arrangement. Two groups of electro-mechanical energy conversion elements (for example, piezoelectric elements, magnetostrictive elements, or the like; represented by piezoelectric elements in the following description), which are arranged to alternately have opposite polarities at a pitch of a ½ wavelength in each group and to be spacially shifted by a ¼ wavelength between the groups are joined and fixed to a vibration member consisting of an elastic member. AC voltages having a time phase difference of about 90° are applied to these two piezoelectric element groups (to be referred to as A and B phases hereinafter) to generate a travelling vibration wave in the vibration member, thereby frictionally driving a movable member which is in press contact with the vibration member. In this vibration wave motor, when the vibration member is resonated by applying the AC voltages to the piezoelectric element groups, each mass point of the vibration member contacting the movable member makes a rotary elliptic motion, and the movable member is frictionally driven by the rotary elliptic motion. The radius of rotation, in the circumferential direction of the vibration member, of the rotary elliptic motion is proportional to the distance from a neutral surface (a surface to which no bending stress acts) to the mass point of the surface of the vibration member. As this distance becomes larger, the driving speed becomes higher if the amplitude remains the same. Therefore, in order to increase the driving speed for the same amplitude and to improve efficiency, a so-called grooved vibration wave motor, in which grooves are formed in the surface, on the side of the movable member, of the vibration member in a direction perpendicular to the travelling direction of the vibration wave is known.

However, in the grooved vibration wave motor, since a grooved portion has a smaller geometrical moment of inertia and a lower flexural rigidity than those of a non-grooved portion (to be referred to as a projection hereinafter), the rigidity is not uniform in the circumferential direction. For this reason, when a standing wave is excited in the vibration member, a partial difference is generated in the vibration amplitude depending on whether the projection is located at the anti-node or node position of the vibration. In contrast to this, as described in Japanese Laid-Open Patent Application No. 62-193569, as shown in FIG. 6, a uniform travelling wave can be formed without disturbing excitation of standing waves by arranging 4n (n is an integer of 1 or more) projections 3 per wavelength of the travelling wave while avoiding the anti-node positions of the two standing waves, which are excited on a vibration member 2 joined with a piezoelectric element 1.

However, when piezoelectric element groups are obtained by performing a plurality of polarization processes for a single piezoelectric element, an internal stress is generated in the boundary portion between the polarized and non-polarized portions of the piezoelectric element due to deformation caused in the polarized portion (electrode portion) of the piezoelectric element in the polarization processes. The internal stress brings about a local increase in the number of pores in the piezoelectric ceramics or cracks, thus lowering the breaking limit (tolerance). Furthermore, in the grooved vibration member, since a groove portion undergoes a larger bending deformation than a projection portion during a vibration, the stress of the piezoelectric element is maximized at the groove portion. Therefore, when piezoelectric element groups to be used are obtained by performing a plurality of polarization processes for a single piezoelectric ceramic plate, in the arrangement of the projections 3 of the prior art shown in FIG. 6, a portion with the smallest strength of the piezoelectric element is located on the lower surface of the groove portion where a maximum stress is generated. As a result, a tensile break of the piezoelectric element, which expands/contracts in a direction perpendicular to the direction of thickness, takes place prematurely, and a vibration amplitude, which is large enough to increase the movable member speed, cannot be obtained.

SUMMARY OF THE INVENTION

One aspect of the invention relates to a vibration driven device having an electro-mechanical energy conversion element which contacts a vibration member formed with a large number of groove portions, and has as its object to prevent destruction of the conversion element by setting the two end positions, in the circumferential direction, of a portion between electrodes formed on the conversion element so as not to coincide with the positions of the groove portions.

Other objects will become apparent form the following detailed description.

DETAILED DESCRIPTION OF THE PREFERRED EMBODIMENTS

Figure 1:
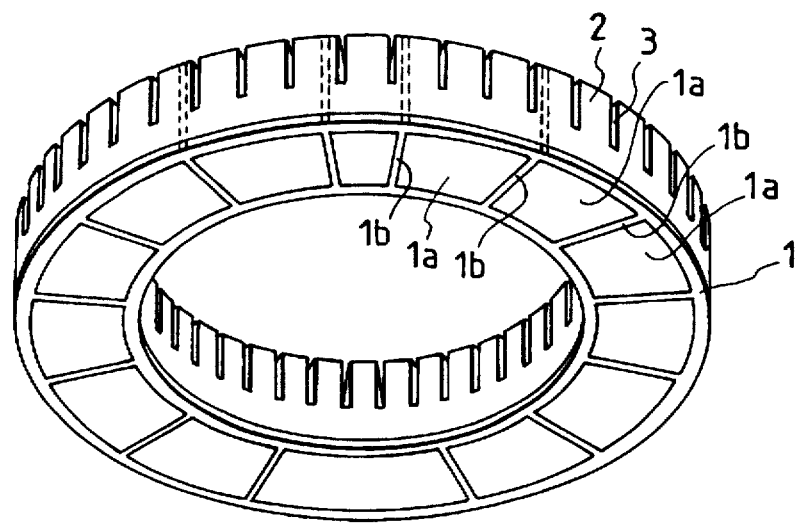
FIG. 1 is a perspective view of a vibration member according to the first embodiment of the present invention.
Figure 2:
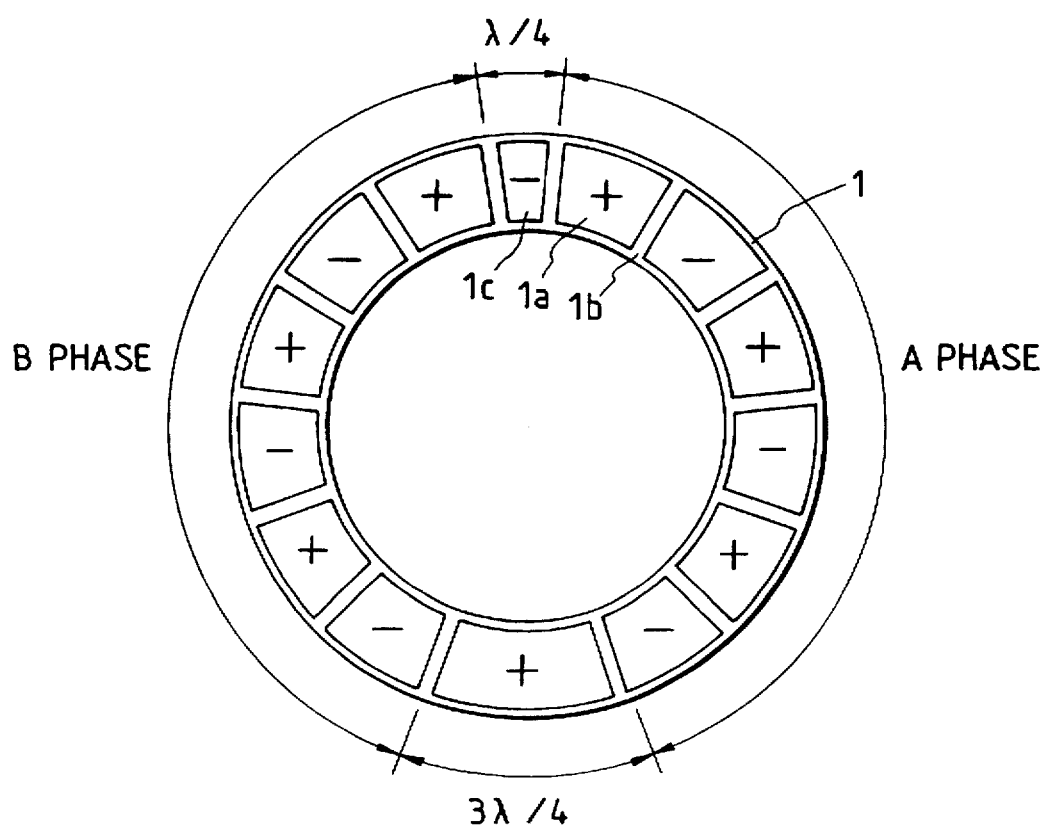
FIG. 2 is a bottom view of the vibration member shown in FIG. 1 to show the arrangement of electrodes on a piezoelectric member.
Figure 3:
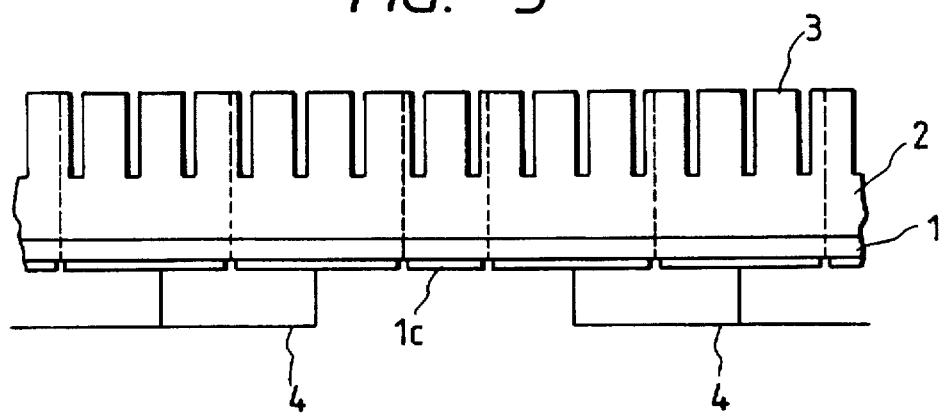
FIG. 3 is a partial side view of the vibration member of the first embodiment.

FIGS. 1 to 3 show the first embodiment.

Referring to FIG. 1, a piezoelectric member 1 as a ring-shaped electro-mechanical energy conversion element is joined by, e.g., an adhesive to a ring-shaped vibration member 2 which consists of an elastic member, the entire circumference of which has formed thereon radial grooves 3. The piezoelectric member has a large number of electrodes 1a partitioned by regions 1b when viewed from its lower surface side, as shown in FIG. 2, and each electrode has a circumferential length of λ/2 with respect to a wavelength λ. These electrodes 1a constitute two groups (A and B phases), as shown in FIG. 2, and these A and B phases are shifted by λ/4 (i.e., these phases are arranged to have a portion 1c polarized by a length of λ/4 therebetween). In the respective electrode sections, the piezoelectric member 1 is polarized in the polarization directions indicated by "+" and "−" in FIG. 2. When AC voltages having a 90° phase difference therebetween are applied to the two groups, i.e., the A and B phases, a bending vibration of a wavelength λ is generated in the vibration member 2 in its circumferential direction. With this vibration, a ring-shaped movable member, which contacts the vibration member 2, is frictionally driven. The circumferential length of the vibration member is an integer multiple (k times) of the wavelength λ, and k=7 in FIG. 2. k is the wave number of the vibration wave motor.

The vibration member 2 has a small geometrical moment of inertia and a low rigidity on the portions of the grooves 3. Therefore, when a bending travelling wave is generated in the vibration member, a bending deformation of each grooved portion of the vibration member becomes larger than that of each projection portion, and a distortion generated in the lower surface of the piezoelectric member 1 corresponding to the portion of each groove 3 becomes larger than other portions. Since an internal stress is generated in the boundary portion between the polarized and non-polarized portions of the piezoelectric member 1 during the polarization processes, the number of pores and cracks increases accordingly.

FIG. 3 is a partial side view of the vibration member 2. The number N of grooves is set to be N=2mk, so that an integer number of grooves are arranged per circumferential length λ/2 of the electrode 1a, and the center of the electrode 1c having a circumferential length λ/4 is located at the center of a projection. As a result, all shift amounts between the centers of the regions 1b between adjacent electrodes and the centers of the grooves 3 become equal to each other (i.e., coincide). In this case, when the groove width is set to obtain a sufficiently large shift amount by setting the number of grooves=42 (m=3 and k=7), each boundary position between the polarized and non-polarized portions, with the weakest strength, of the piezoelectric member is located on the lower surface of each projection portion of the vibration member, which portion generates a small bending stress in the piezoelectric member, thus avoiding a decrease in breaking limit amplitude of the piezoelectric member.

Figure 4:
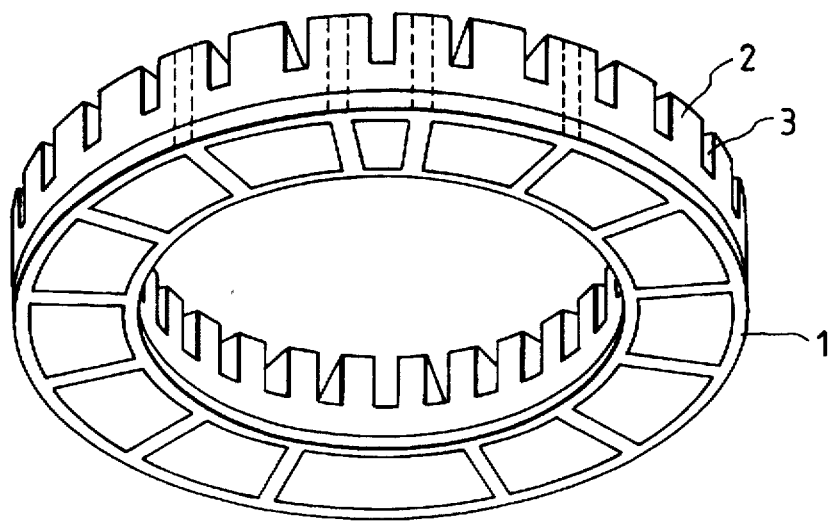
FIG. 4 is a perspective view of a vibration member according to the second embodiment of the present invention.

FIG. 4 is a perspective view obtained when k=7 and N=28. In this embodiment, when the circumferential width of a region between adjacent electrodes is sufficiently smaller than that of a projection, the center of the region between adjacent electrodes is located at the center of the projection, thereby locating the boundary portion between the polarized and non-polarized portions under the projection.

Figure 5:
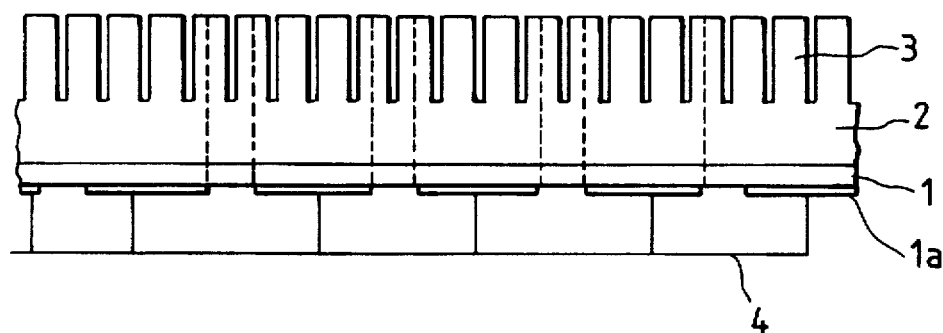
FIG. 5 is a partial side view of a vibration member to show the arrangement of grooves and electrodes according to the third embodiment of the present invention.
Figure 6:
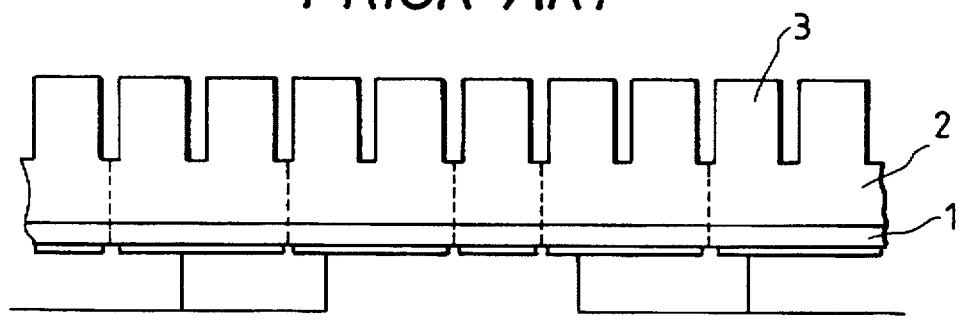
FIG. 6 is a partial side view of a vibration member showing the conventional arrangement of grooves and electrodes.

FIG. 5 shows a case wherein N=4mk, so that the interval between the regions 1b between adjacent electrodes is set to be an integer multiple of the circumferential interval between the grooves, thereby causing the two ends, in the circumferential direction, of each electrode to coincide with the lower portions of the centers of the projections. In FIG. 5, N=4k is set, and the interval between the regions between adjacent electrodes is set to be equal to the interval between the grooves. Such a structure is effective for a case wherein the number of grooves is large with respect to the wave number k of the vibration member, and the circumferential width of each projection is small.

Note that the present invention is not limited to a ring-shaped vibration member, but may be applied to a track-shaped vibration member, a linear vibration member, a vibration member which is constituted by forming a plurality of projections in a circular pattern on a disk, and the like. In each of the above embodiments, the vibration member 2 is fixed in position. However, the vibration member itself can be moved by the vibration wave. More specifically, the vibration member moves relative to a contact member which contacts the vibration member. Note that the contact member may be a sheet, paper, or the like.

As described above, according to each of the above embodiments, the boundary portion between the polarized and non-polarized portions of an electro-mechanical energy conversion element such as a piezoelectric element is located under the projection portion while avoiding the groove portion. Therefore, the tensile break amplitude upon expansion/contraction of the piezoelectric element in a direction perpendicular to the direction of thickness, can be increased, and hence, the movable member speed can also be increased.

Figure 7:
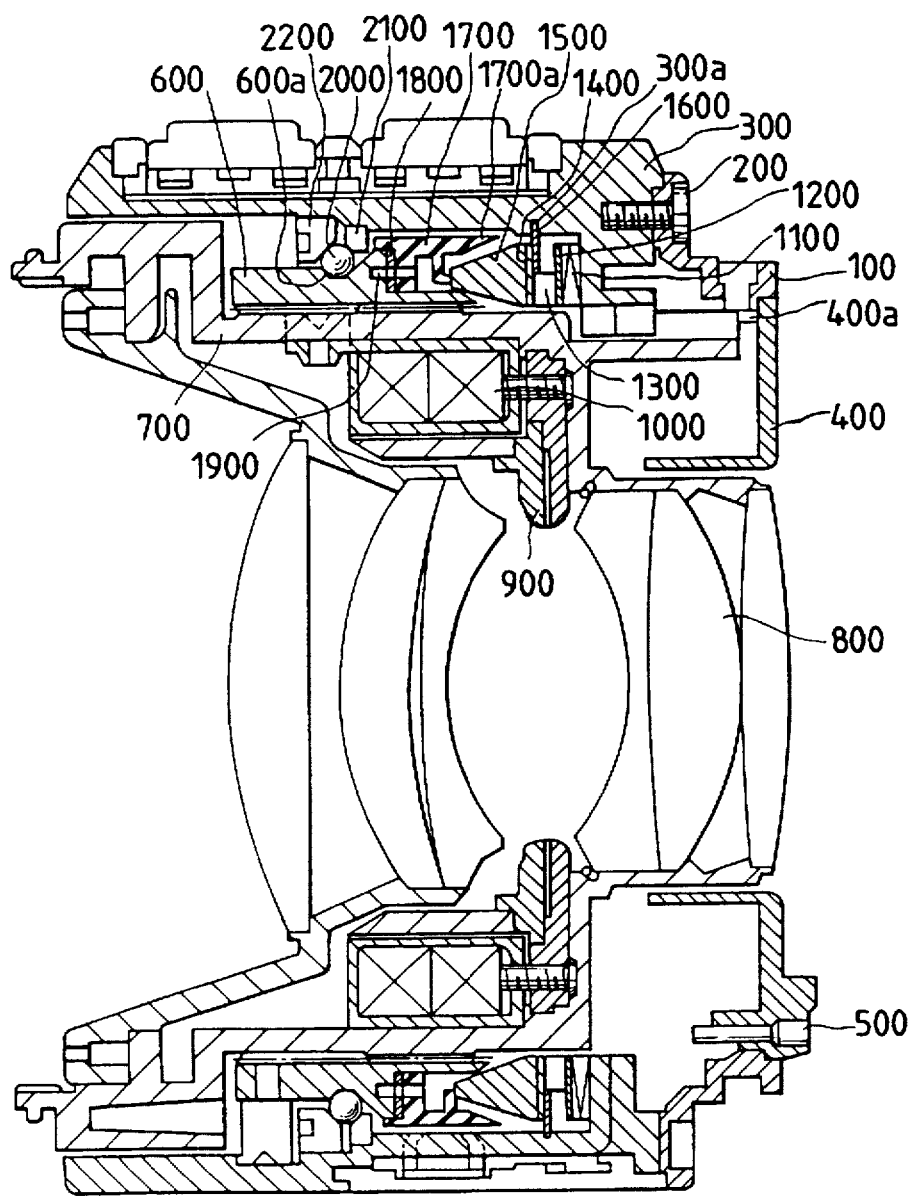
FIG. 7 is a sectional view showing an embodiment of a lens barrel which uses a vibration driven device as a driving source.

FIG. 7 shows a lens barrel which uses the above-mentioned vibration driven device as a driving source.

FIG. 7 shows the structure of the lens of another embodiment when the vibration wave motor is applied to an interchangeable lens for a single lens reflex camera. In FIG. 7, reference numeral 100 designates a mount mounted on the lens mounting portion of the camera body, not shown, reference numeral 200 denotes a fixing screw, and reference numeral 300 designates a fixed cylinder integrally coupled to the mount 100 by means of the fixing screw 200. Reference numeral 400 denotes a back lid resiliently coupled to the mount 100 by means of a resilient portion 400a.

Reference numeral 500 designates a plurality of contacts for effecting signal exchange with the camera body, not shown. Reference numeral 600 denotes a rotary cylinder having a rotary helicoid screw rotated by a vibration wave motor which will be described later, and reference numeral 700 designates a rectilinear cylinder threadably engaged with the rotary helicoid screw.

When the rotary cylinder 600 is rotated by the vibration wave motor which will be described later, a lens portion designated by 800 in the rectilinear cylinder 700 moves rectilinearly, whereby focus adjustment is accomplished. The rectilinear cylinder 700 has a diaphragm unit 900, which also moves rectilinearly with the lens portion 800. Reference numeral 1100 designates a counter-sunk spring for effecting frictional engagement between a vibratory member and a moving member, both to be described. The counter-sunk spring 1100 is inserted in the fixed cylinder 300. The counter-sunk spring 1100 urges a rotary member 1500 comprising a resilient member against a rotor 1700 through a washer 1200, felt 1300 as a vibration absorbing member, and an electro-strictive element 1400 as an electro-mechanical energy converting element secured to the back of the vibratory member 1500. The electro-strictive element 1400 is arranged with a phase difference in a conventional manner. The element 1400 may be polarized into a plurality of states in the fashion of phase difference. A terminal 1600 is connected to the electro-strictive element 1400 jointed to the annular vibratory member 1500 of trapezoidal cross-sectional shape, and voltages having a 90° phase difference are applied through a lead line (terminal 1600) to generate a travelling vibration wave in the vibratory member 1500 in a conventional manner. The rotor 1700 is a moving member having a flange portion 1700a and is integrally coupled to the rotary cylinder 600 by a rubber ring 1800 and a pin 1900. The rotor 1700 is rotated by the travelling vibration wave generated in the vibratory member 1500, whereby the rotary cylinder 600 is rotated with the moving member 1700.

A V-shaped groove 600a is formed in the rotary cylinder 600, and the V-shaped groove 600a holds a plurality of balls 2000 provided on the circumference with the aid of a ball receiver 2100 fitted to the fixed cylinder 300 and a ball keeper 2200 threadably engaged with the fixed cylinder 300, thereby decreasing the friction resistance of the rotary cylinder 600 and smoothing the rotation thereof. The rotary member 1500 is biased in the direction of the optic axis by countersunk spring 1100, and is maintained in pressure contact with the moving member 1700 having the flange portion 1700a, such that the moving member 1700 is frictionally driven by the travelling vibration wave generated by the vibratory member 1500.

The vibration absorbing member 1300 is formed of rubber, felt or like material and has the effect of not transmitting mechanical vibration to the fixed cylinder 300 and not attenuating the vibration of the underside of the vibratory member 1500. The washer 1200 serves to uniformly transmit the spring force of the countersunk spring 1100 to the vibratory member 1500.

What is claimed is:

1. A vibration driven device comprising:

a vibration member having a plurality of projection portions defined by a respective plurality of grooves formed in a contact surface of the vibration member; and an electro-mechanical energy conversion element contacting said vibration member, said conversion element having a plurality of electrodes for receiving an applied signal to generate a vibration in said vibration member, each electrode having radial boundary portions and inner and outer circumferential boundary portions, wherein the inner and outer circumferential boundary portions of said plurality of electrodes of said conversion element are located substantially coincident with said plurality of projection portions of said vibration member, and each radial boundary portion of said plurality of electrodes of said conversion member is located coincident with one of said plurality of projection portions of said vibration member.

2. A device according to claim 1, wherein said plurality of electrodes of said conversion element are divided into two groups, a positional phase difference of a ¼ wavelength is formed between the two groups, and the electrodes in each of the two groups are polarized to alternately have opposite polarization directions at an interval of a ½ wavelength.

3. A device according to claim 1, wherein middle positions between adjacent electrodes of said plurality of electrodes substantially coincide with centers of said plurality of projection portions.

4. A device according to claim 1, wherein each radial boundary portion of said plurality of electrodes substantially coincides with a center of one of said plurality of projection portions.

5. A device according to claim 1, wherein said vibration member is substantially ring shaped, and said conversion element is substantially disk shaped.

6. A device according to claim 3, wherein said vibration member is substantially ring shaped, and said conversion element is substantially disk shaped.

7. A device according to claim 4, wherein said vibration member is substantially ring shaped, and said conversion element is substantially disk shaped.

8. An electric equipment assembled with a vibration driven device of claim 1.

9. An electric equipment assembled with a vibration driven device of claim 3.

10. An electric equipment assembled with a vibration driven device of claim 4.

11. A device according to claim 2, wherein middle positions between adjacent electrodes of said plurality of electrodes substantially coincide with centers of said plurality of projection portion.

12. A device according to claim 2, wherein each radial boundary portion of said plurality of electrodes substantially coincides with a center of one of said plurality of projection portions.

13. A device according to claim 2, wherein a relationship between the number N of said plurality of projection portions and a wave number k of a vibration wave satisfies the equation N=4mk, where m is a natural number.

14. A device according to claim 13, wherein middle positions between adjacent electrodes of said plurality of electrodes substantially coincide with centers of said plurality of projection portions.

15. A device according to claim 13, wherein each radial boundary portion of said plurality of electrodes substantially coincides with a center of one of said plurality of projection portions.

16. A vibration driven device as recited in claim 1, wherein a circumferential gap is provided between each of the inner and outer circumferential boundary portions of the electrodes of the electro-mechanical energy conversion element and the respective inner and outer circumferential boundary of the vibration member.

* * * * *

UNITED STATES PATENT AND TRADEMARK OFFICE
CERTIFICATE OF CORRECTION

PATENT NO. : 5,798,598
DATED : August 25, 1998
INVENTOR(S) : KOSUKE FUJIMOTO

It is certified that error appears in the above-identified patent and that said Letters Patent is hereby corrected as shown below:

At [57] ABSTRACT

Line 3, "projective" should read --projection--.

Column 2

Line 31, "form" should read --from--.

Column 3

Line 16, "k" should read --"k"--.

Signed and Sealed this

Thirtieth Day of March, 1999

Attest:

Q. TODD DICKINSON

Attesting Officer

Acting Commissioner of Patents and Trademarks